(12) United States Patent
Nimberger

(10) Patent No.: US 8,955,823 B2
(45) Date of Patent: *Feb. 17, 2015

(54) CAM OPERATED VALVE

(71) Applicant: PGI International, Ltd., Houston, TX (US)

(72) Inventor: Spencer M. Nimberger, Houston, TX (US)

(73) Assignee: PGI International, Ltd., Houston, TX (US)

( * ) Notice: Subject to any disclaimer, the term of this patent is extended or adjusted under 35 U.S.C. 154(b) by 16 days.

This patent is subject to a terminal disclaimer.

(21) Appl. No.: 13/644,068

(22) Filed: Oct. 3, 2012

(65) Prior Publication Data

US 2013/0056665 A1 Mar. 7, 2013

Related U.S. Application Data

(63) Continuation-in-part of application No. 13/082,219, filed on Apr. 7, 2011.

(51) Int. Cl.
*F16L 37/28* (2006.01)
*F16K 35/02* (2006.01)
*F16L 29/00* (2006.01)
*F16K 31/524* (2006.01)

(52) U.S. Cl.
CPC ............... *F16K 35/02* (2013.01); *F16L 29/007* (2013.01); *F16K 31/52408* (2013.01)
USPC .................. 251/149.4; 251/149.6; 251/149.8; 251/149.9; 251/251; 285/34; 285/316; 285/322; 285/317; 403/118

(58) Field of Classification Search
USPC ................. 251/103, 107, 109, 152, 251, 263, 251/149.1–149.9, 150, 142, 143, 147, 148; 285/34, 314–317, 320, 322; 403/118
See application file for complete search history.

(56) References Cited

U.S. PATENT DOCUMENTS

| | | | | |
|---|---|---|---|---|
| 2,675,829 A | * | 4/1954 | Livers | 137/614.06 |
| 3,039,794 A | * | 6/1962 | De Cenzo | 137/614.03 |
| 3,071,188 A | * | 1/1963 | Raulins | 285/23 |
| 3,224,800 A | * | 12/1965 | Fisher | 403/118 |
| 3,419,246 A | * | 12/1968 | Burgess | 251/205 |
| 3,918,485 A | * | 11/1975 | Weber et al. | 137/594 |
| 4,275,907 A | * | 6/1981 | Hunt | 285/18 |
| 4,444,419 A | * | 4/1984 | Maeshiba | 285/12 |
| 5,215,120 A | * | 6/1993 | Nimberger et al. | 137/614 |
| 5,649,723 A | * | 7/1997 | Larsson | 285/34 |

(Continued)

OTHER PUBLICATIONS

"ME796 QCC Quick Fill Coupling," undated, www.marshallexecelsio.com/files/pd/i/ME799.pdf, admitted prior art, 2 page advertisement.

*Primary Examiner* — Marina Tietjen
(74) *Attorney, Agent, or Firm* — Renner, Otto, Boisselle & Sklar, LLP

(57) ABSTRACT

A product transfer valve (1) includes a valve body (3), an inlet port (2), an outlet port (18). A safety interlock mechanism includes a segmented collar (22) with internal threads (23) for mounting the valve to a connection. A safety collar (6) is axially movable between a valve open position and a valve closed position, and causes movement of the segmented collar. An interference member (12) engages the safety collar (6) to prevent inadvertent radial outward movement of the internal threads on the segmented collar until the safety collar is moved to the valve closed position.

20 Claims, 22 Drawing Sheets

(56) References Cited

U.S. PATENT DOCUMENTS

| | | |
|---|---|---|
| 5,836,352 A | 11/1998 | Nimberger |
| 6,343,630 B1 * | 2/2002 | Dubinsky ..................... 141/385 |
| 6,367,775 B1 | 4/2002 | Nimberger |
| 6,478,343 B2 * | 11/2002 | King Lee ..................... 285/322 |
| 7,140,645 B2 * | 11/2006 | Cronley ......................... 285/34 |
| 7,793,914 B2 * | 9/2010 | Danielson .................. 251/149.9 |
| 2010/0327575 A1 * | 12/2010 | Blanchard et al. .............. 285/34 |

* cited by examiner

CAM OPERATED VALVE

CROSS REFERENCE TO RELATED APPLICATION

This application claims priority from and is a continuation in part of U.S. application Ser. No. 13/082,219 filed on Apr. 7, 2011, the disclosure of which is incorporated herein by reference for all purposes.

FIELD OF THE INVENTION

The present invention relates generally to valves used in the delivery of liquid or gaseous products. More specifically, a cam operated valve desirably provides minimal venting of product on disconnect and rapid connection and disconnection of the valve to the system.

BACKGROUND OF THE INVENTION

Cam operated valves with minimum vent features have long been known. Several types are exemplified in U.S. Pat. Nos. 6,367,775 and 5,836,352. These valves are typically connected to the end of a product delivery hose and are operated manually in the transfer of gaseous or liquid products. The cam operated open and close feature provides fast operation without the repetitive motion found in the operation of a typical valve closure utilizing a threaded stem operated by a hand wheel. The hand wheel requires the operator to engage in a repetitive twisting wrist motion which may lead to repetitive motion injury.

Most cam operated valves still require a repetitive twisting motion to repeatedly connect the valve to the receiving or dispensing container. The thread engagement is typically only 4 threads, but since the connection operation is done with one hand it takes about three twists to get one rotation of the connector, so that the operator is subjected to at least 12 twisting motions to connect the device and another 12 twisting motions to disconnect the device. In the case of filling propane cylinders, for example, one operator may be asked to fill 50 or more cylinders in a day. Accordingly, the operator's wrist is subjected to 1,200 twisting motions which may lead to repetitive motion injury.

The present invention addresses the repetitive motion connection problem with a valve that uses cam operation and minimum vent features to provide a safe and quick connection feature that eliminates repetitive motion.

The disadvantages of the prior art are overcome by the present invention, and an improved cam operated valve is hereinafter disclosed.

SUMMARY OF THE INVENTION

In one embodiment, a segmented threaded collar is biased to an open position by radially enclosed springs and prevented from over travel by a retaining collar which encloses the segmented collar. When the retaining collar is moved with respect to the segmented collar to the "open position", the segmented collar is opened partially by the biasing springs to a diameter allowing the engagement threads on one end to be placed over the mating connection thread. When the retaining collar is moved with respect to the segmented collar to the "closed position", the collar is returned to its radially collapsed position which engages the mating connection threads. A small rotation of the retaining collar of about ⅛th turn will tighten the connection for the transfer of product.

One embodiment utilizes an internal sleeve to expand the segmented threaded collar when the retaining collar is moved to the "open position." The sleeve is internal to the segmented threaded collar and is connected to the retaining collar by pins fixed to the retaining collar and interfacing with holes in the internal sleeve, such that a ramped surface on the internal sleeve contacts an internal surface of the segmented threaded collar to force the collar segments to open as the retaining collar is moved to the open position.

While the elimination of repetitive motion on the connect and disconnect is desirable, the expanding collar feature as described above may allow the operator to undesirably disconnect the valve from the product transfer container while the valve is still open by simply pulling the retaining collar to the open position. To prevent this from occurring, a safety feature is employed wherein the position of the segmented collar is transmitted to the proximity of the open/close cam by two connection rods and a safety collar. A safety collar is spring biased to force the retaining collar to the closed position via the connecting rods. Therefore, when the retaining collar is in the closed position, the safety collar will be further from the open/close cam and when the retaining collar is in the open position, the safety collar will be closer to the open/close cam. A safety tab is then attached to the open/close cam such that when the segmented collar is in the closed position and the open/close cam is in the open position, any attempt to move the retaining collar from the closed position will be prevented by the interference of the safety tab on the open/close cam with the safety collar. When the open/close cam is placed in the closed position, the safety tab will not prevent moving the segmented collar to the open position. Safe operation is assured and the minimum vent and repetitive motion elimination features of the valve are maintained.

A further feature of the invention is to prevent accidental partial opening of the valve using the cam operated lever when the retaining collar is not in the down position which locks the segmented collar to the attaching valve.

A feature of the invention is the use of removable pins or other torque transfer members radially affixed to the retaining collar which provide for rotation, separation, and alignment of the threaded segments, interface with the internal sleeve and permit assembly of the device.

These and further features and advantages of the present invention will become apparent from the following detailed description, wherein reference is made to the figures in the accompanying drawings.

DETAILED DESCRIPTION OF PREFERRED EMBODIMENTS

Figure 1:
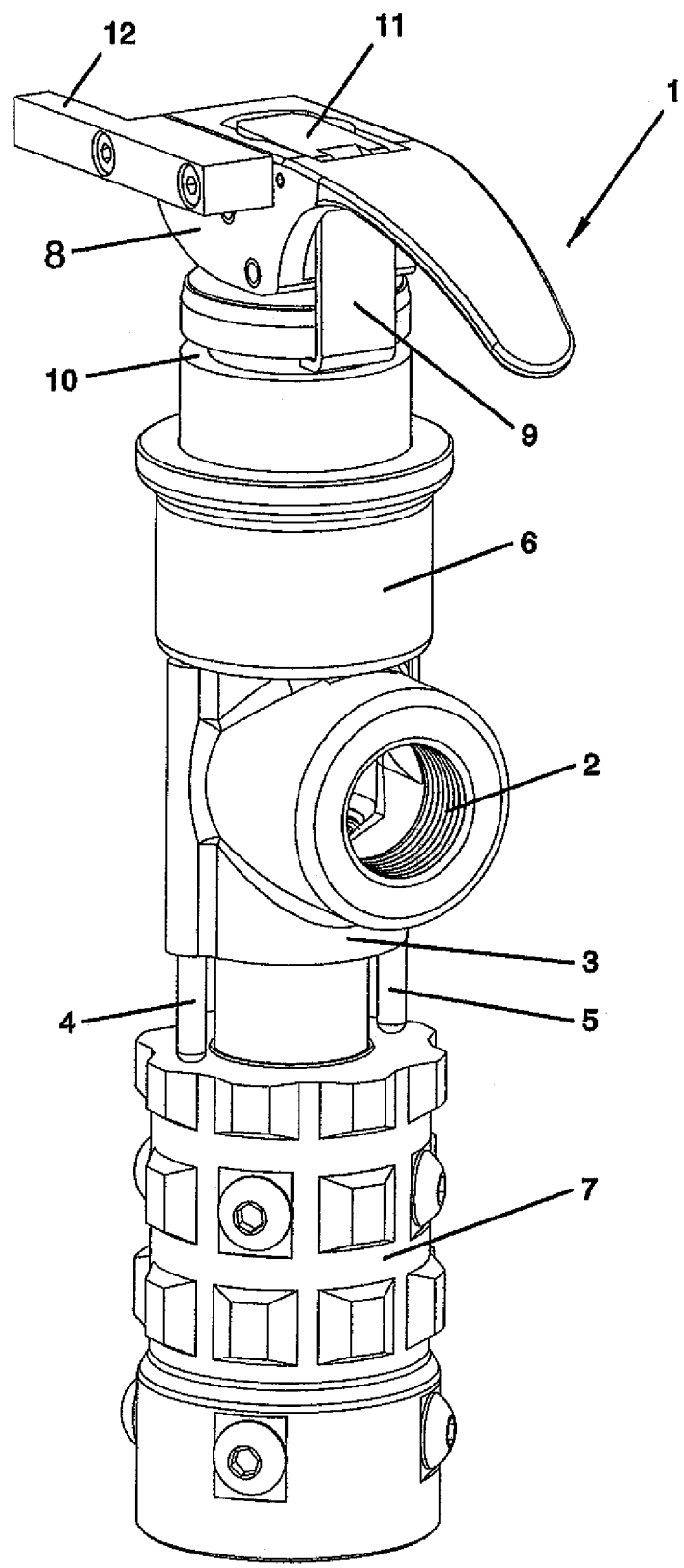
FIG. 1 is an isometric view of one embodiment of a valve assembly.
Figure 2:
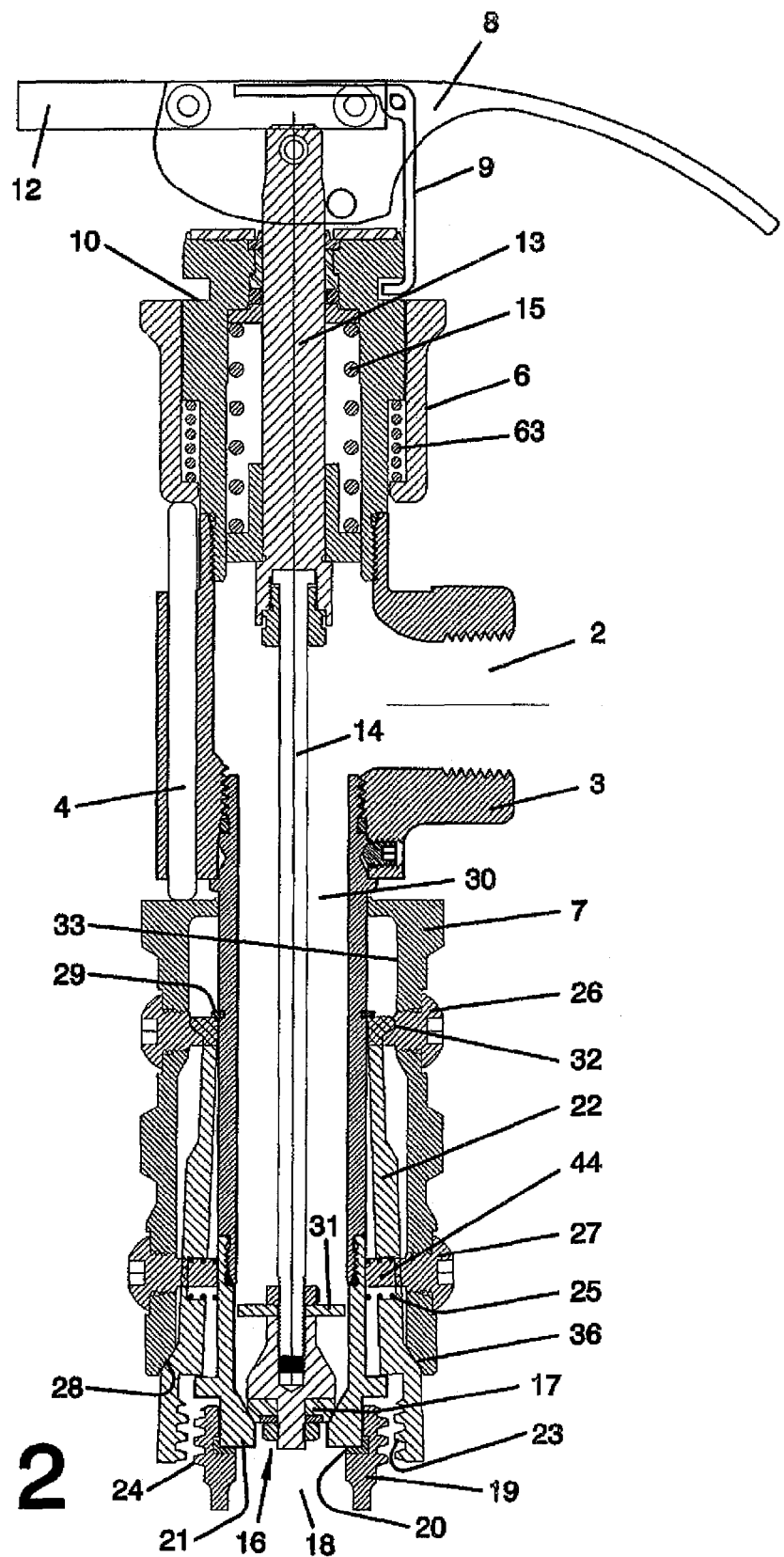
FIG. 2 is a cross-sectional view of a spring biased valve assembly with the operating cam in the closed position and the retaining collar in the open position.
Figure 3:
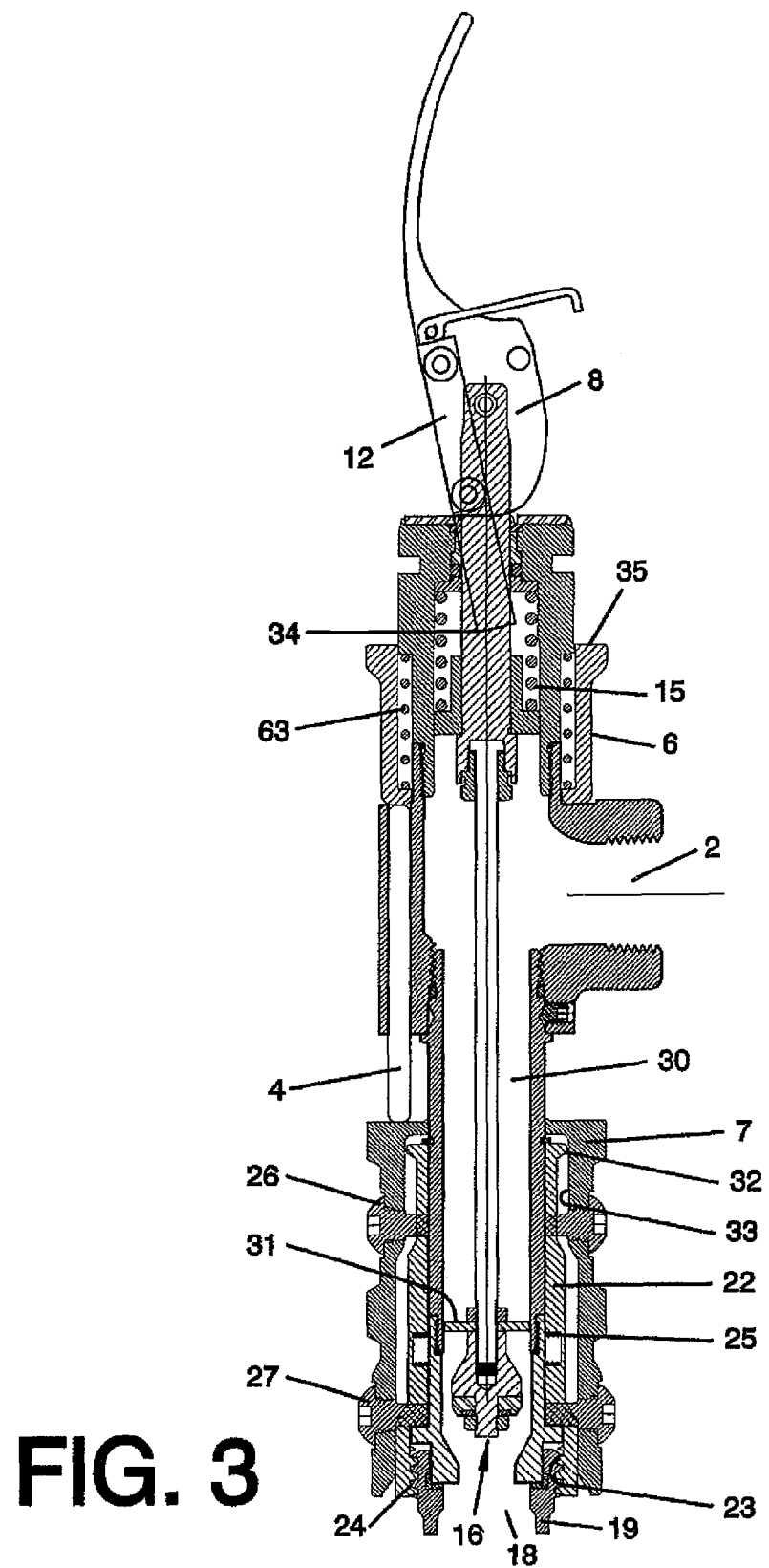
FIG. 3 is a cross-sectional view of a spring biased valve assembly with the operating cam in the open position and the retaining collar in the closed position.

FIG. 1 depicts many of the components of one embodiment of the cam operated product transfer valve 1. The product transfer hose connects to valve port 2 contained on main valve body 3. Port 2 in one application may be a fluid inlet port, with an axially positioned outlet port at the lower end of the valve body. Two push rods 4 and 5 communicate motion between the downwardly spring biased safety collar 6 and the retaining collar 7. The operating cam 8 is used to open and close valve 1. Spring biased latch 9 retains the cam in the closed position by locking into recess 10. To open the cam operator 8, the latch 9 is pressed at location 11 which pivots the latch free of the recess 10 and allows the cam operator 8 to be pulled to the open position. Safety tab 12 as shown in FIG. 2 is attached to cam 8 such that when the cam 8 is moved to the fully open position, the safety collar 6 must be in the down position as shown in FIG. 1 or the tab 12 will hit the safety collar 6 and prevent full opening of the cam 8. Similarly, with the cam 8 in the open position as shown in FIG. 3, the retaining collar 7 is prevented from being moved to an open position since safety tab 12 will interfere with the upward movement of safety collar 6 and rods 4 and 5 will thus prevent the upward movement of retaining collar 7, thereby keeping the valve locked on the connection as long as the cam is open. The safety collar 6 is biased axially away from operator 8 by coil spring 63.

FIG. 2 shows the valve 1 in cross section with the operating cam 8 in the closed position, the retaining collar 7 in the open position and push rods 4 depicted out of their true circumferential location for clarity in the cross section view. The valve includes valve stem 13 which is biased in the downward direction by spring 15. Stem 13 is further connected to rod 14 which is connected to seat assembly 16 containing an elastomeric seal 17 which prevents flow of product to the product connection cavity 18. Seat assembly 16 is kept centered in the outlet flow bore 30 by a four legged centering member 31. Threaded member 19 exemplifies the generic connection to the product container or product containing system which may be of many sizes and thread types. The container connection 19 may provide an elastomeric seal 20 which seals with the valve body member 21 located at the outlet port of the valve.

FIG. 3 shows the valve with the operating cam 8 in the open position which raises the seat assembly 16 allowing flow of product from inlet port 2 to the outlet port cavity 18. The threaded and segmented collar 22 is in the closed or locked position wherein the threads 23 on the segmented collar 22 fully engage the threads 24 on the threaded member 19 of the product containing system. FIG. 2 shows the segmented collar 22 in the open position biased to that position by a plurality of springs 25 on each segment of the collar 22. The collar segments are circumferentially spaced by a plurality of pins 26 and 27, i.e., the segments maintain their circumferential positioning by the pins. The pins 26 and 27 also drive or rotate the collar 22 segments when retaining collar 7 is then rotated to fully thread to product container member 19. The retaining collar 7 may thus be rotated to tighten or loosen the threaded connection to the product transfer container. As retaining collar 7 is pulled in the upward direction compressing spring 63, the collar 22 segments are biased by a springs 25 in each segment to an open position, as shown in FIG. 2. The radial expansion of the segmented collar 22 is limited by ramp 28 on retaining collar 7 contacting surface 36 of the collar 22 segments. The tapered surfaces 28 and 36 also aid in moving the threads 23 to the closed position in response to axial movement of the retaining collar 7. The upward travel of retaining collar 7 is limited by ring 29 contacting pins 26. The collar 22 is restrained from expansion at its uppermost end by lip 32 contacting the bore 33 of retaining collar 7. In the fully expanded position, the segments of collar 22 and the collar threads 23 are opened to a diameter larger than the threads 24 on container member 19, thus allowing the valve to be placed in a position shown in FIG. 2 wherein the valve is in a connection position but the connection threads are not engaged.

In FIG. 3, the retaining collar 7 is moved to the closed position which collapses the segments of collar 22 into engagement with the threads of container member 19. Collar 7 may then be rotated slightly to tighten the threads on collar 22 to the threads on member 19 and allowing cam 8 to be rotated to an open position for the transfer of product. In the cam 8 open position, the end 34 of safety tab 12 will prevent safety collar 6 and retaining collar 7 via rods 4 and 5 from being moved to an open position thereby providing for operator safety. Only after the cam 8 has been moved to a closed position can retaining collar 7 be moved to an open position.

Figure 18:
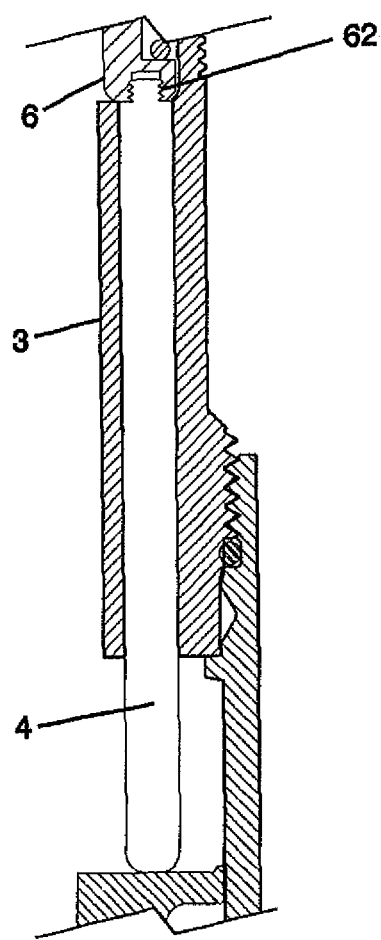
FIG. 18 is a cross sectional view showing the integration of the safety collar and one or more connection rods.

FIG. 18 shows an alternative safety collar and rod arrangement wherein the rods 4 are affixed to safety collar 6 by threads 62. The rods transfer axial forces from the safety collar to the retaining collar, and thus may or may not be connected to either or both the safety collar and the retaining collar. In other embodiments, the rods may be replaced with circumferentially spaced slats or with a c-shaped member with its slot aligned with the valve inlet port. Either the slats or the c-shaped member may transfer forces from the safety collar to the retaining collar.

Figure 4:
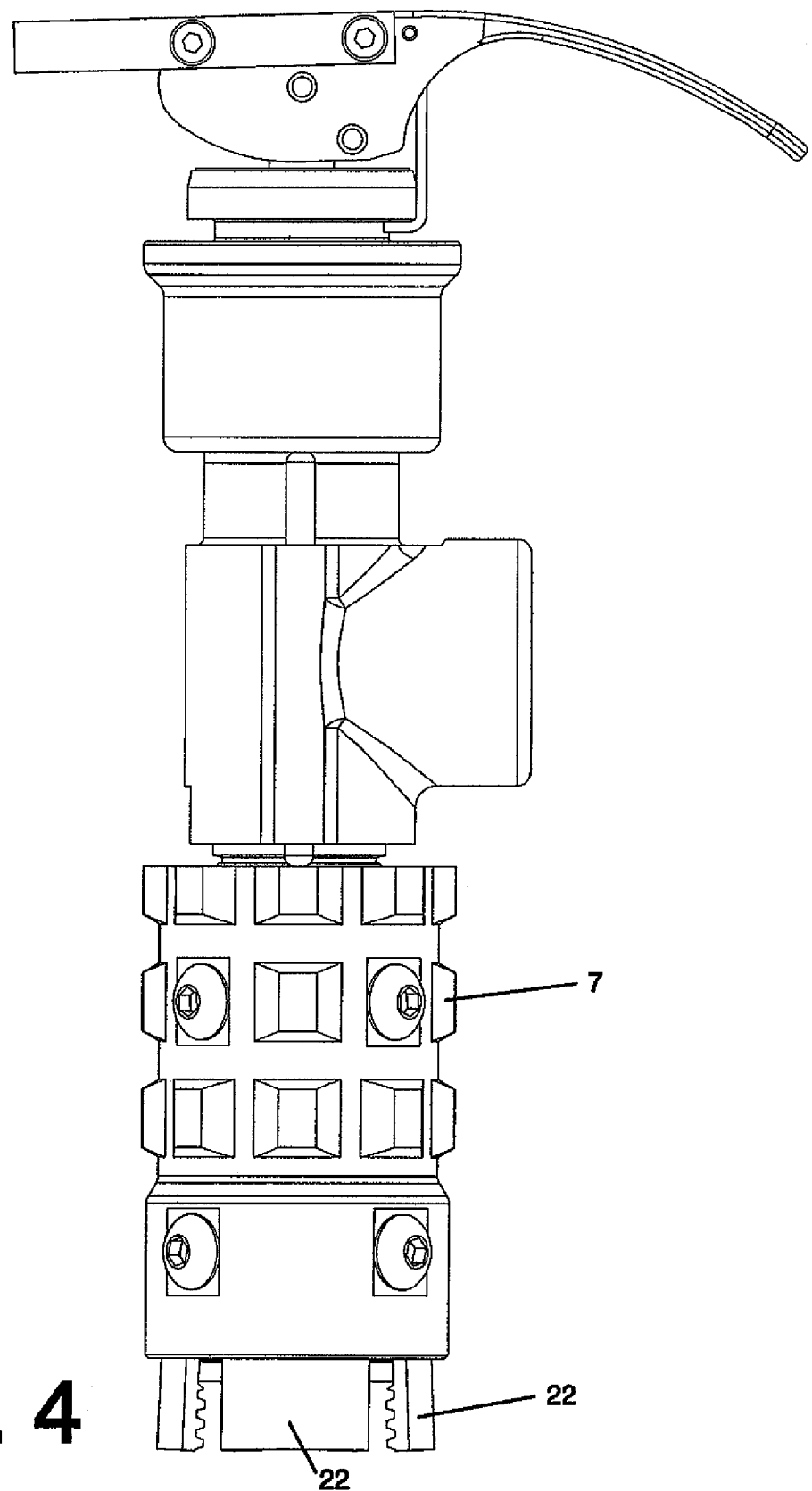
FIG. 4 is a side view of the valve assembly with the operating cam in the closed position and the retaining collar in the open position.

FIG. 4 shows an external view of the valve 1 with the retaining collar 7 in the open position and the spring biased segmented collar 22 expanded.

Figure 5:
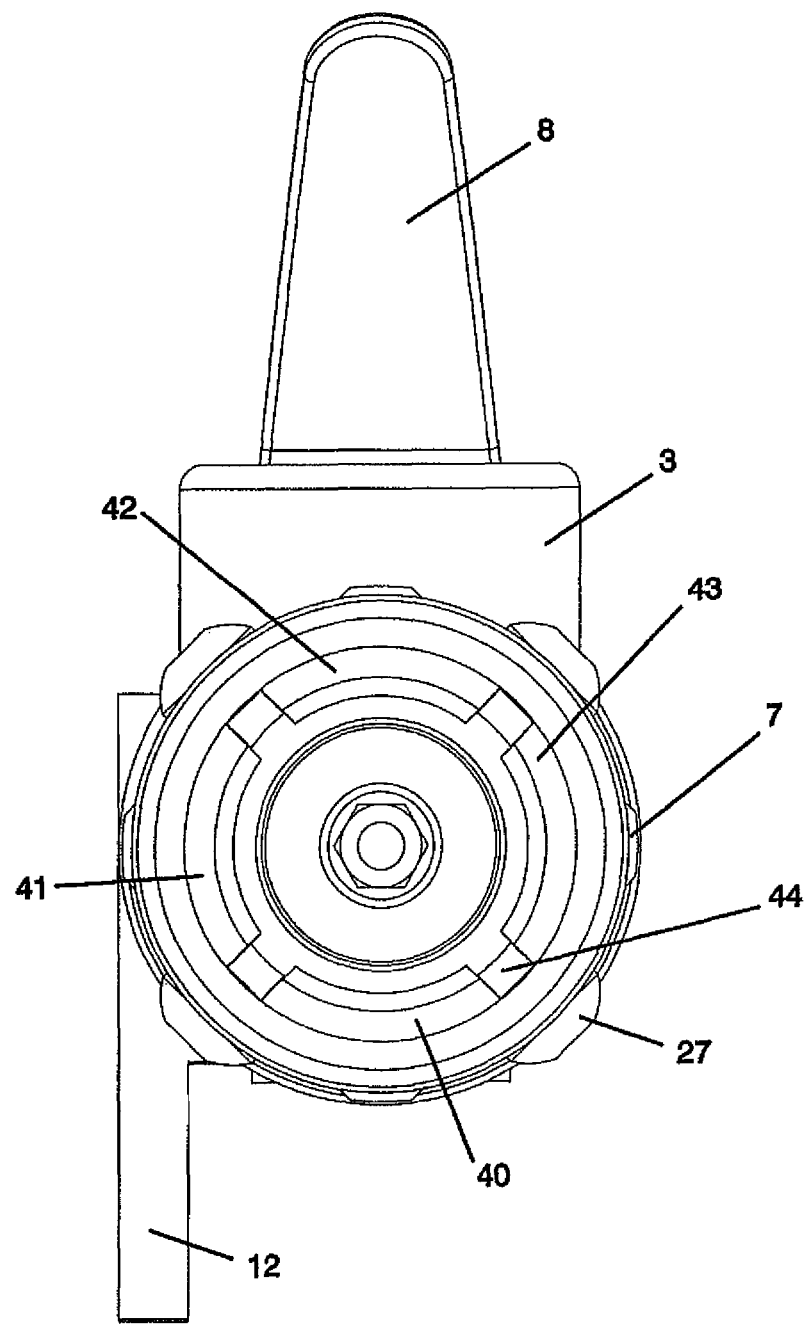
FIG. 5 is a bottom view of a spring biased valve assembly with the retaining collar in the closed position.
Figure 6:
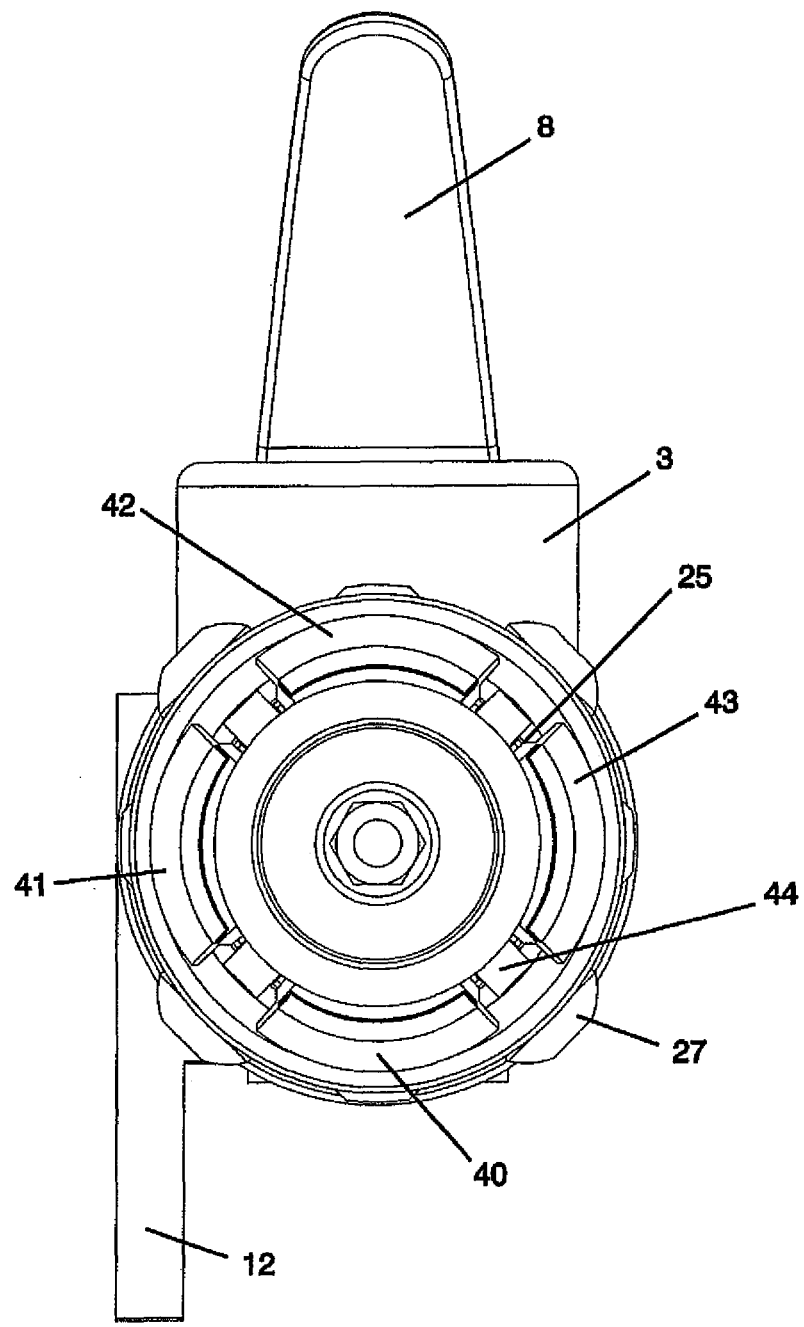
FIG. 6 is a bottom view of a spring biased valve assembly with the retaining collar in the open position.
Figure 7:
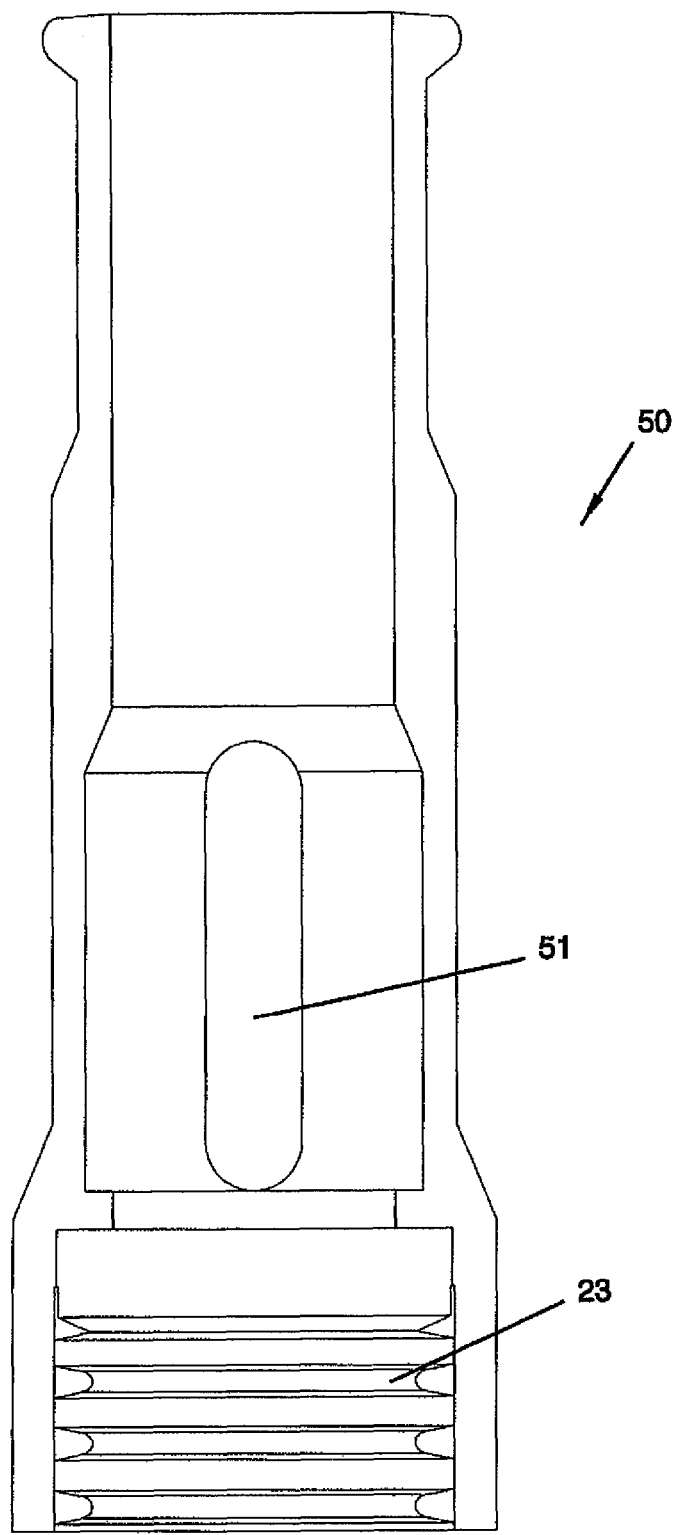
FIG. 7 is an internal facing view of a segmented threaded collar segment from an internal sleeve biased valve assembly with an alignment slot.
Figure 8:
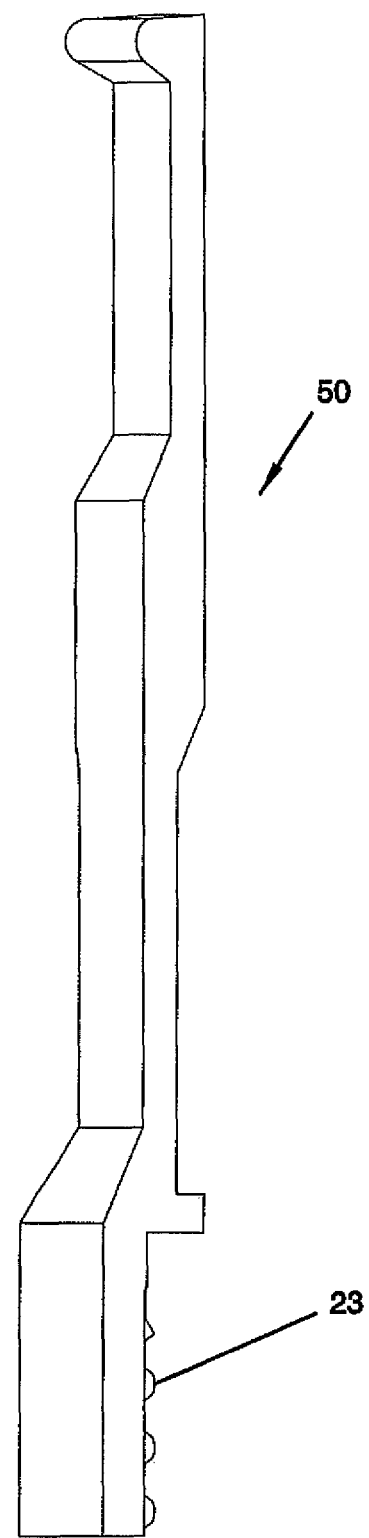
FIG. 8 is a side view of a segmented threaded collar segment from an internal sleeve biased valve assembly.
Figure 9:
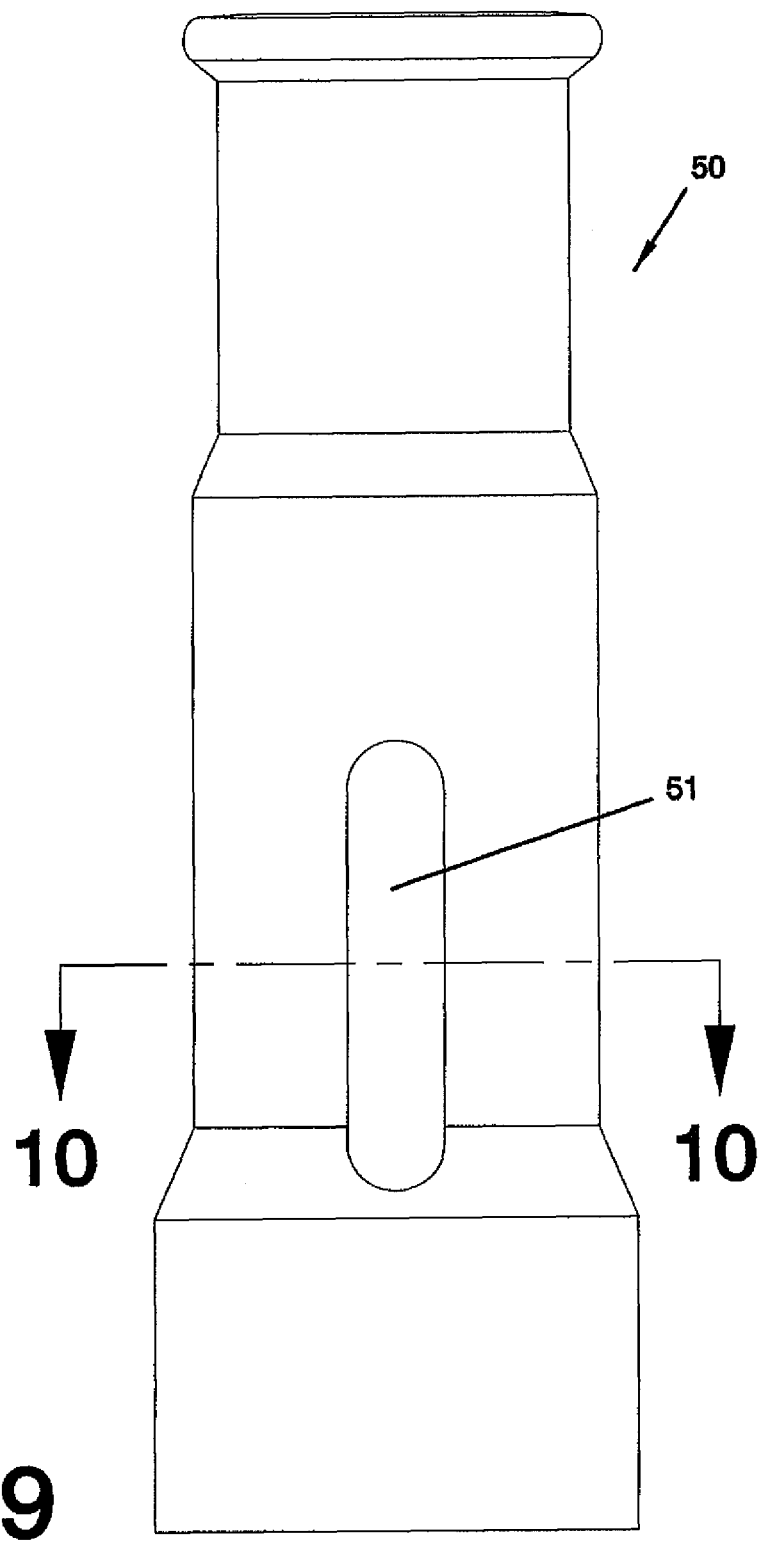
FIG. 9 is an external facing view of a segmented threaded collar segment from an internal sleeve biased valve assembly with an alignment slot.
Figure 10:
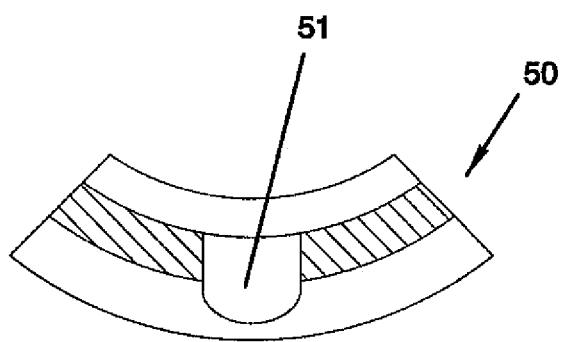
FIG. 10 is section view of FIG. 9.

FIG. 5 is a bottom end view of valve 1 showing spring biased segmented collar 22 with segments 40, 41, 42 and 43 in the closed or locked position. The stem 44 of pins 26 and 27 provide separation of the collar 22 segments and serve to drive the segments as retaining collar 7 is rotated to tighten or loosen the product transfer connection. FIG. 6 particularly shows four pins and the four spring biased segments 40, 41, 42, and 43 each spaced between two pins, although the number of pins will vary with different applications.

FIG. 6 is a bottom view of valve 1 with the spring biased segments in an expanded or open position biased by springs 25. The segments 40, 41, 42, and 43 are thus each spaced between a pair of pins, with a biasing spring 25 in each segment radially outward.

The segmented collar as disclosed herein technically may not be considered a collar in a sense that it does not have a 360° ring member which supports the radially movable segments. In one application, a unitary ring member may maintain the circumferential position of the segments extending axially from the ring member, but in other applications, such as that disclosed herein, the segments are each individual pieces with slots extending axially between the pieces. The circumferential position of the segments may then be maintained by the pins, as disclosed herein. This latter construction allows a relatively low spring force to be used to bias each segment radially outward since the segments are not mechanically interconnected. The safety collar 6 is preferably a true collar in the sense that it occupies a full 360° and surrounds the valve body. Both of the safety collar 6 and the retaining collar 7 preferably include a 360° component to transfer forces required to radially move the threaded sections 23 inward and outward. The forces are reliably transmitted from the safety collar to the retaining collar and from the retaining collar to the segments and from the segments to the threaded section 23 on the segments.

Figure 11:
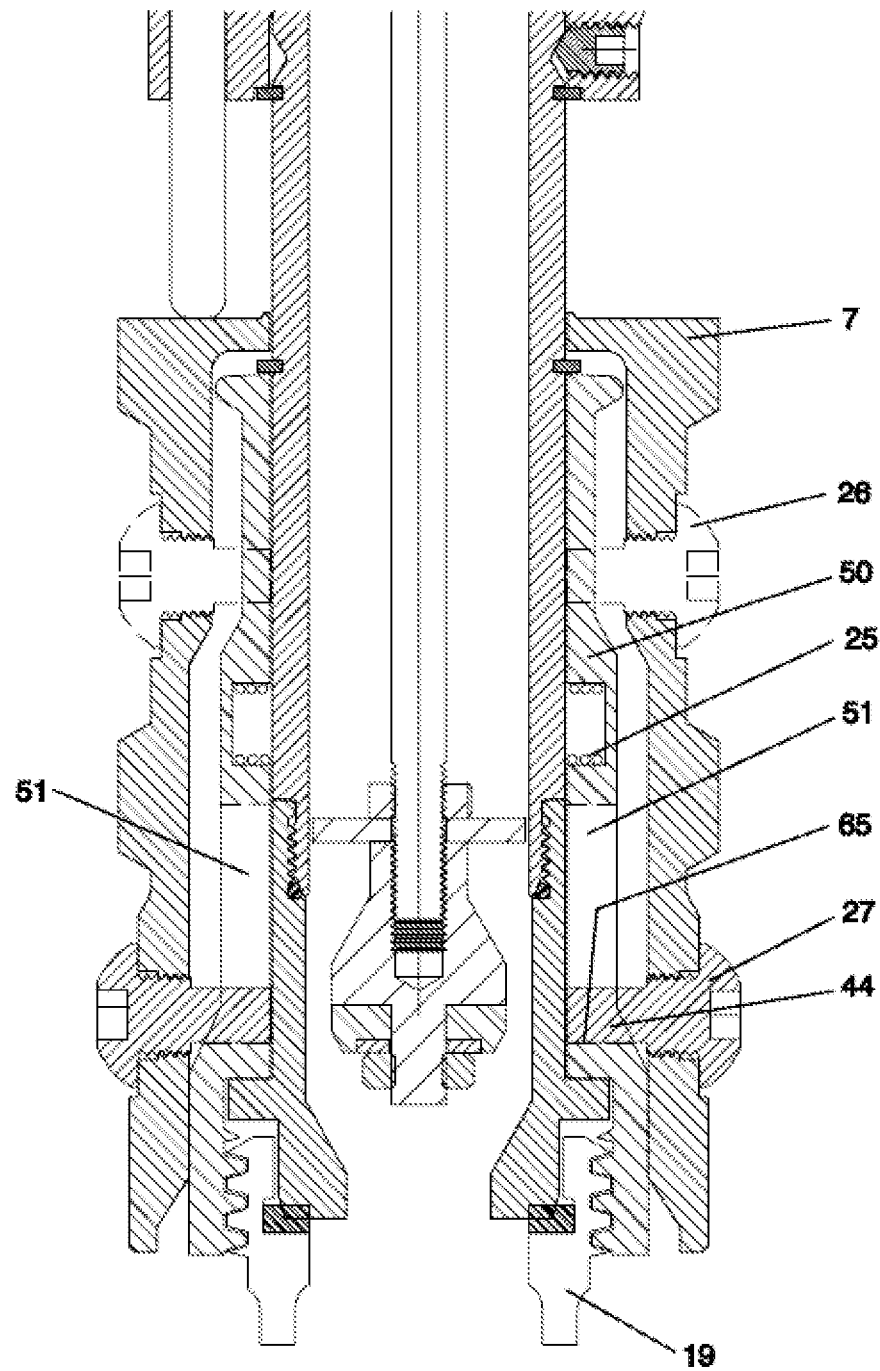
FIG. 11 is a cross-sectional view of the lower portion of a spring biased valve assembly with a slotted segmented collar and an alignment slot in the closed position.

FIGS. 7, 8, 9 and 10 shows different views of a single segment 50 of another variation of the segmented collar which uses a slot 51 in each segment to control the radial alignment of each segment and prevent excess circumferential movement of the segments when the segmented collar is in the open position. In this embodiment, a set of alignment pins 27 as shown in FIG. 11 are positioned to engage the slot in each segment which limits circumferential movement of the segments while permitting axial movement of the pins 27 during the actuation of the retaining collar. Since the spacing between the segments at the threaded end of the segmented collar increases when the collar is in the open position, the embodiment in FIG. 5 with the pins 27 between the segments allows for increased circumferential motion in that position, whereas the slotted variation controls that motion which may be detrimental to positioning the valve over the male connection member 19. This variation could also encompass two slots in each segment (not shown) wherein both pin sets 27 and 26 engaged slots in segment 50.

Figure 12:
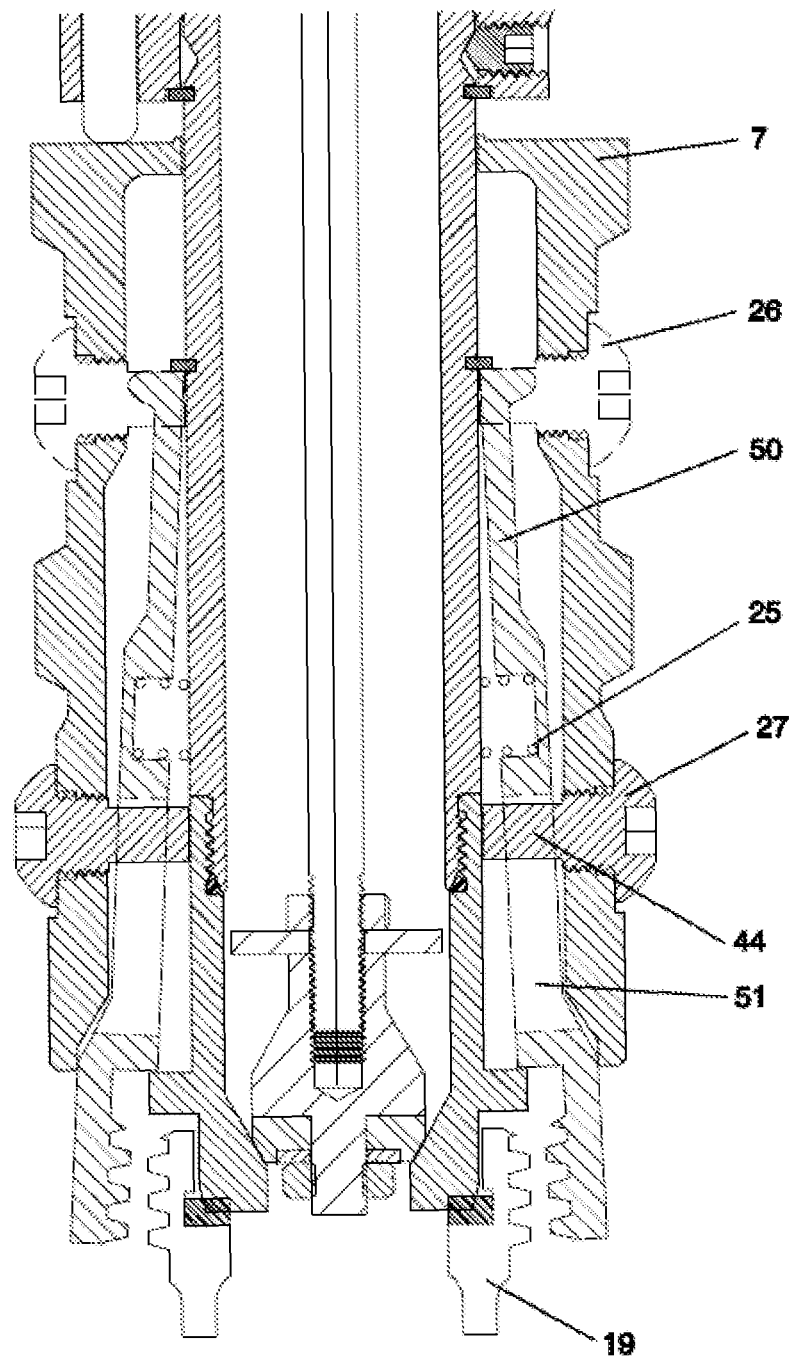
FIG. 12 is a cross-sectional view of the lower portion of a spring biased valve assembly with a slotted segmented collar and an alignment slot in the open position.

FIG. 11 shows the assembly of the slotted segment embodiment in the closed position which uses springs 25 to open the segments as the retaining collar 7 is moved to the open position, as shown in FIG. 12.

Figure 13:
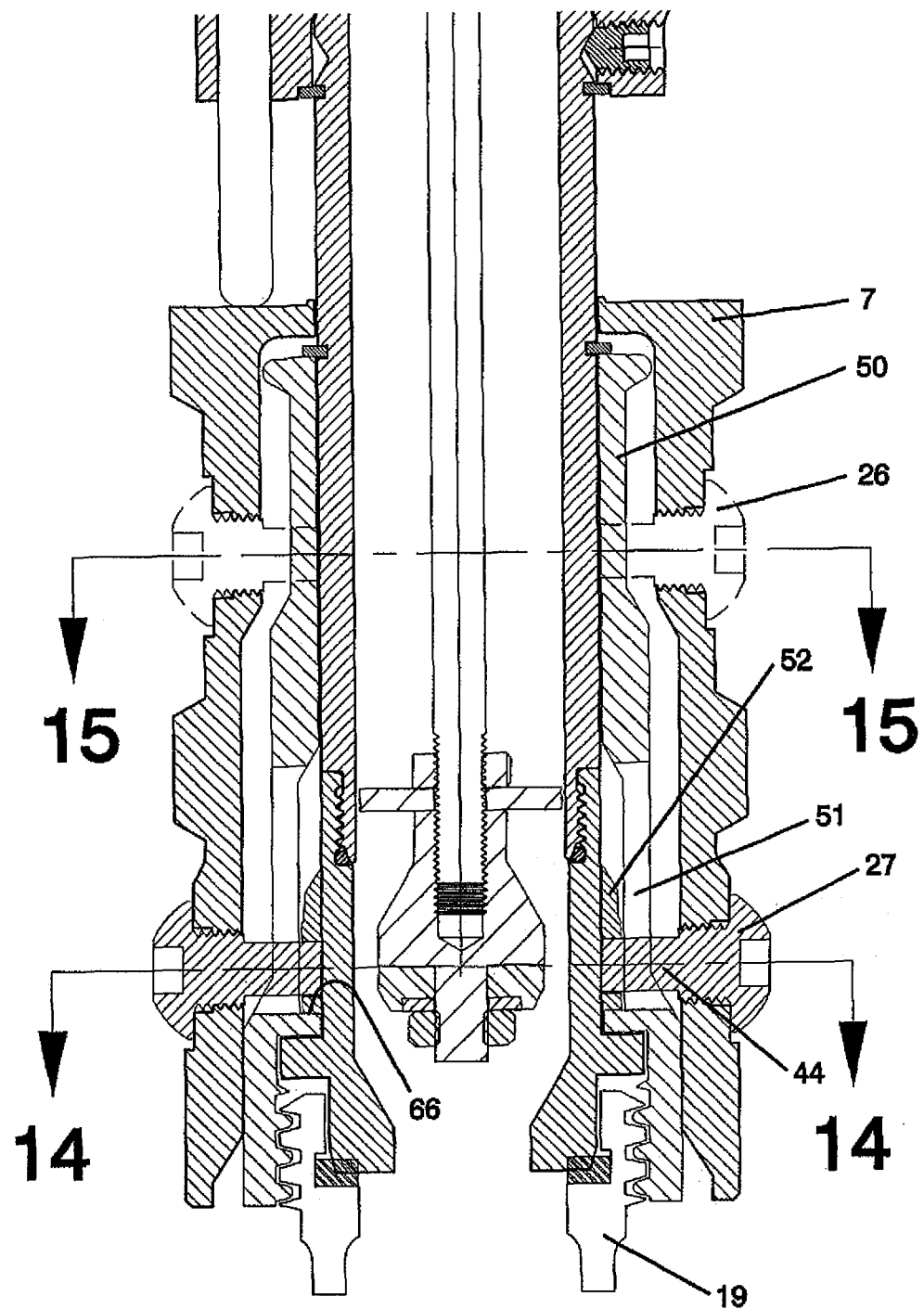
FIG. 13 is a cross-sectional view of the lower portion of an internal sleeve biased valve assembly with a slotted segmented collar and an alignment slot in the closed position.

FIG. 13 depicts the segmented collar actuation assembly wherein slots 51 are used in the segments 50 and an internal sleeve 52 secured to the collar by stems 44 of pin 27 which forces open the collar segments 50 when the retaining collar 7 is moved to the open or jaw disengaged position. The ramp surface 57 on sleeve 50 thus forces the segments outward when the internal sleeve 52 moves up relative to the valve body being driven by engagement with stems 44 of pin 27 as shown in FIG. 16

Figure 15:
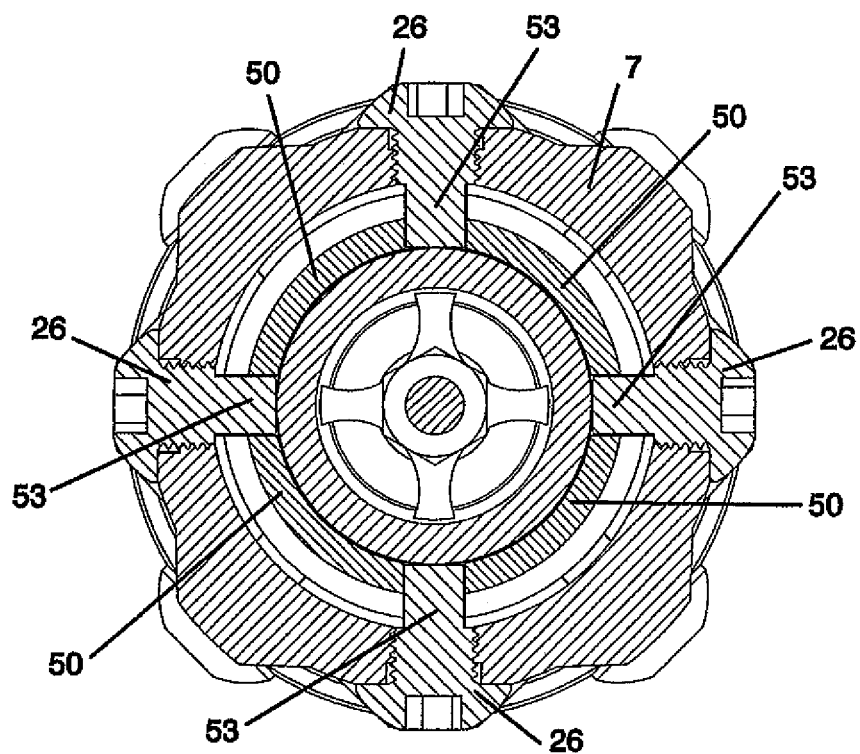
FIG. 15 is section view of FIG. 13.

FIG. 15 shows the stems 53 of pins 26 providing the separation and rotational driving engagement of segments 50 at the upper end of the segmented collar.

Figure 14:
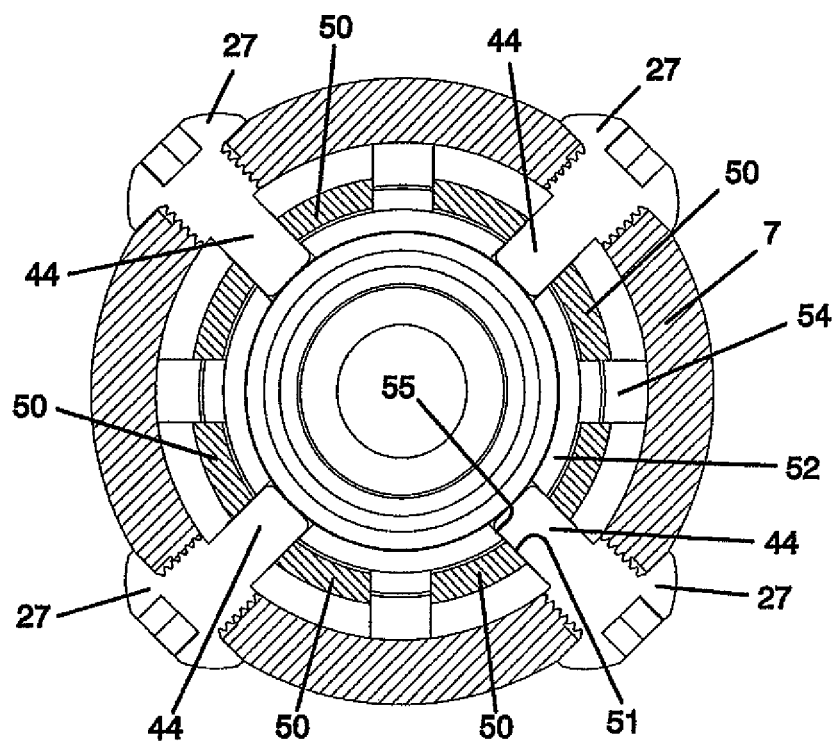
FIG. 14 is section view of FIG. 13.

FIG. 14 shows stems 44 of pin 27 engaged in slot 51 of segment 50 and in holes 55 in internal sleeve 52, providing separation 54 and rotational driving engagement for segments 50 and axial movement for internal sleeve 52.

Figure 16:
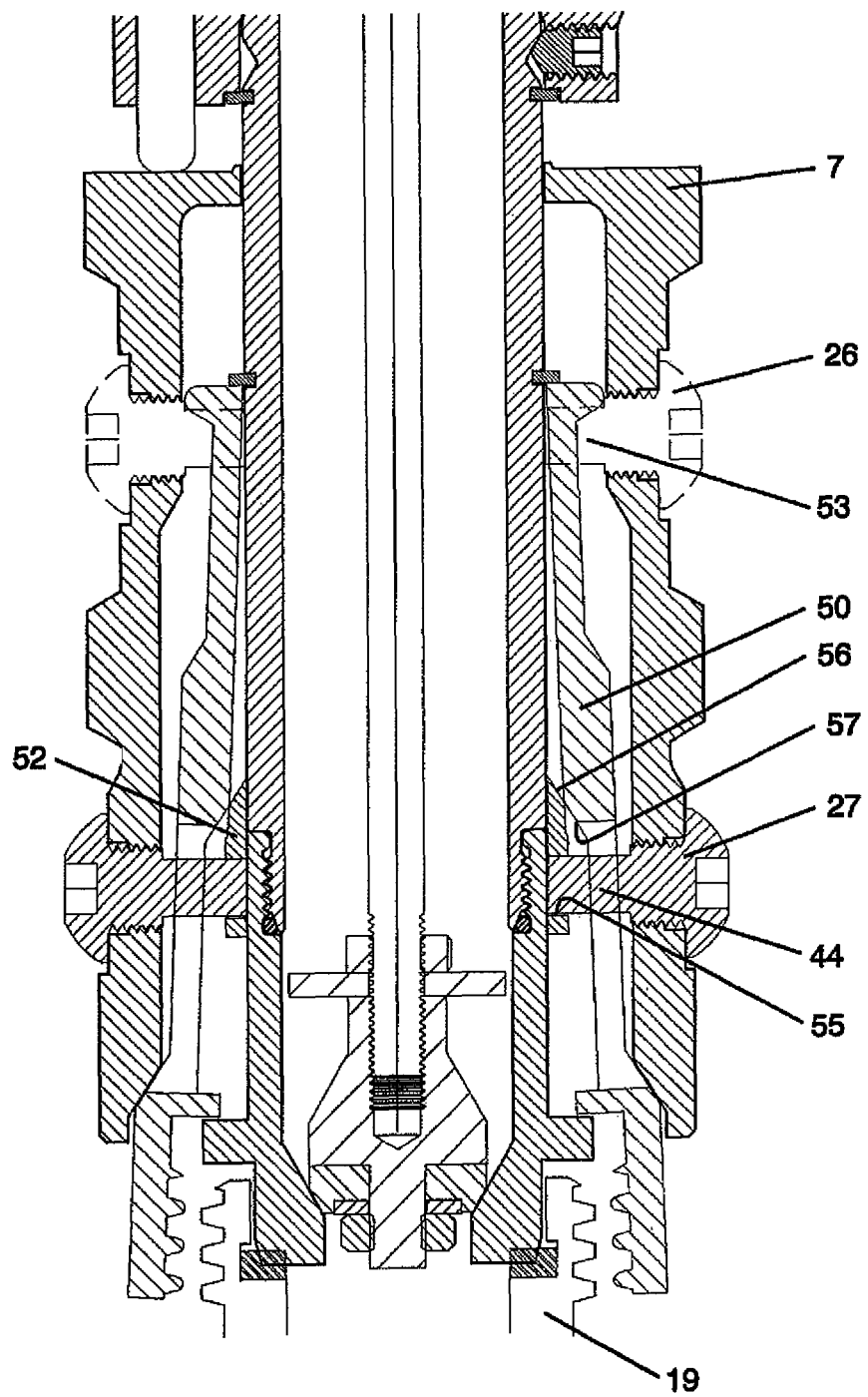
FIG. 16 is a cross-sectional view of the lower portion of an internal sleeve biased valve assembly with a slotted segmented collar and an alignment slot in the partially open position.

FIG. 16 shows the internal cam sleeve 52 moved axially by stems 44 such that the engagement of surface 56 of sleeve 52 against inner surface 57 of segment 50 opens the segments 50 of the segmented collar.

Figure 17:
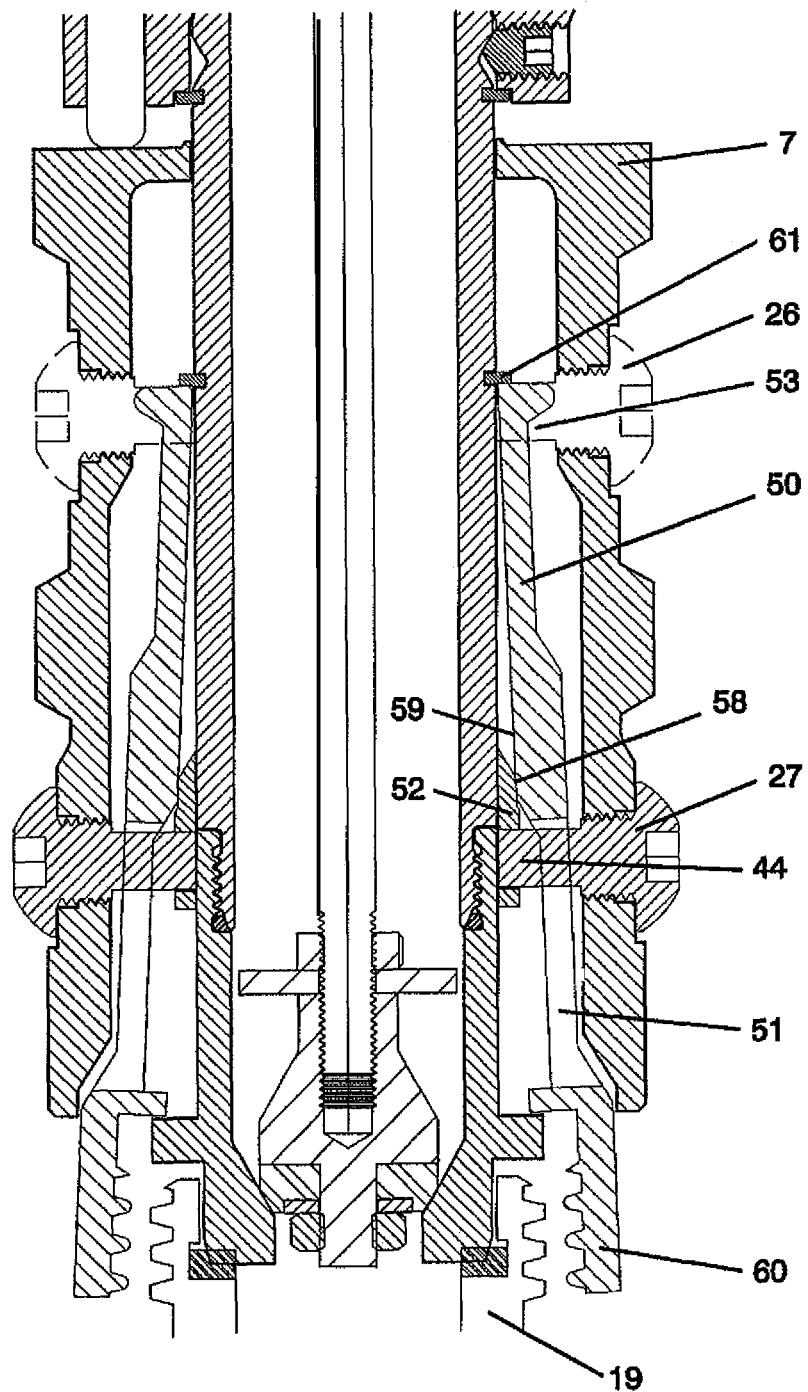
FIG. 17 is a cross-sectional view of the lower portion of FIG. 16 in the full open position.

FIG. 17 shows the retaining collar 7 moved to the full open position wherein inner surfaces 59 of segments 50 contact outer surface 58 of inner sleeve 52 which prevents ends 60 of segments 50 from collapsing radially and thereby aids the operation of the connection function. The spring assisted opening embodiments of FIGS. 2 and 12 function but allow inward radial movement of a segment 50 when the retaining collar is in full open position, which may inhibit connection to the male member 19 if a segment strikes the member 19 during the connection operation.

It should be noted that pin set 26 and 27 removably located in the retaining collar 7 may be used to enhance both the operation and assembly of the valve. As shown in FIG. 17, the full open position of the retaining collar 7 is limited by stem 53 of pin 26 contacting spiral ring 61, and the full closed position of retaining collar 7 is limited by stem 44 contacting end 65 of slot 51 in each segment 50 in FIG. 11 or contacting end 66 of slot 51 in FIG. 13. Further to the spacing and driving function of the pins 26 and 27 is their removability which enables assembly of the device.

To move the valve from the disconnected position as shown in FIG. 2 to a connected position as shown in FIG. 3, so that the valve body is connected to the container connection 19, an operator may grasp the exterior of retainer sleeve 7 and push downward, thereby moving the thread 23 from the disengaged position to the engaged position. To disengage the valve body from container connection 19, the retainer collar 7 is moved axially toward the inlet 2, which then moves the safety collar 6 axially due to the presence of pins 4 and 5. The interaction between axial movement of the collars and the operation of the valve operating cam 8 is discussed above.

Figure 19:
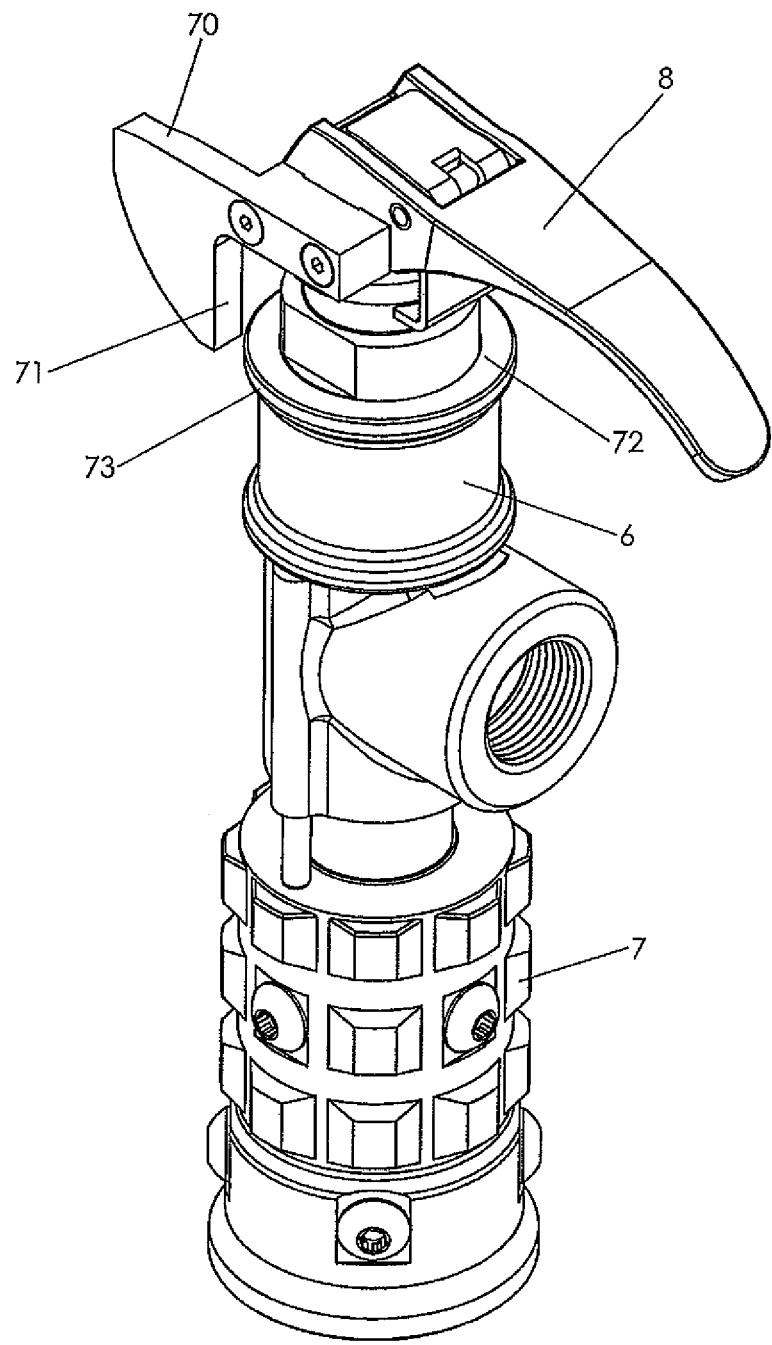
FIG. 19 is an isometric view of the valve assembly with the cam operator in the closed position and the retaining collar in the closed position showing the proximity of the safety tab and the safety collar.

FIG. 19 shows an alternate style of an interference member 70. With the cam operator 8 in the closed position, surface 71 of interference member 70 comes in close proximity to the top surface 72 of safety collar 6 and the side surface 73 of safety collar 6, thus preventing the partial or full opening of the valve if collar 6 is not in the full down position.

Figure 20:
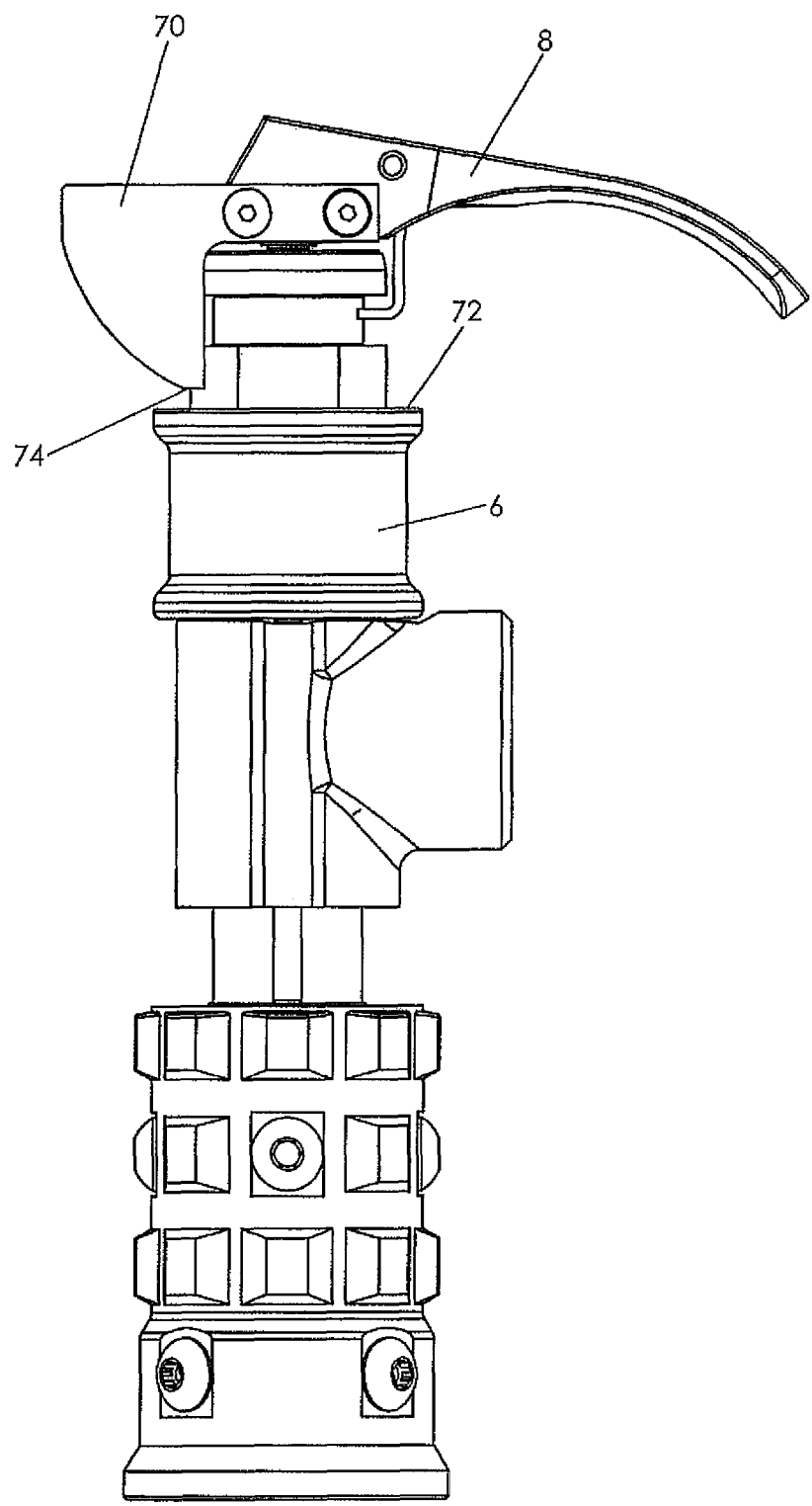
FIG. 20 is a side view of the valve in FIG. 19.

FIG. 20 shows the surface 74 of interference member 70 having clearance with the surface 72 of safety collar 6. This will allow the cam operator 8 to be rotated to the open position as previously described when the safety collar 6 is in the down position, as shown in FIG. 20.

Figure 21:
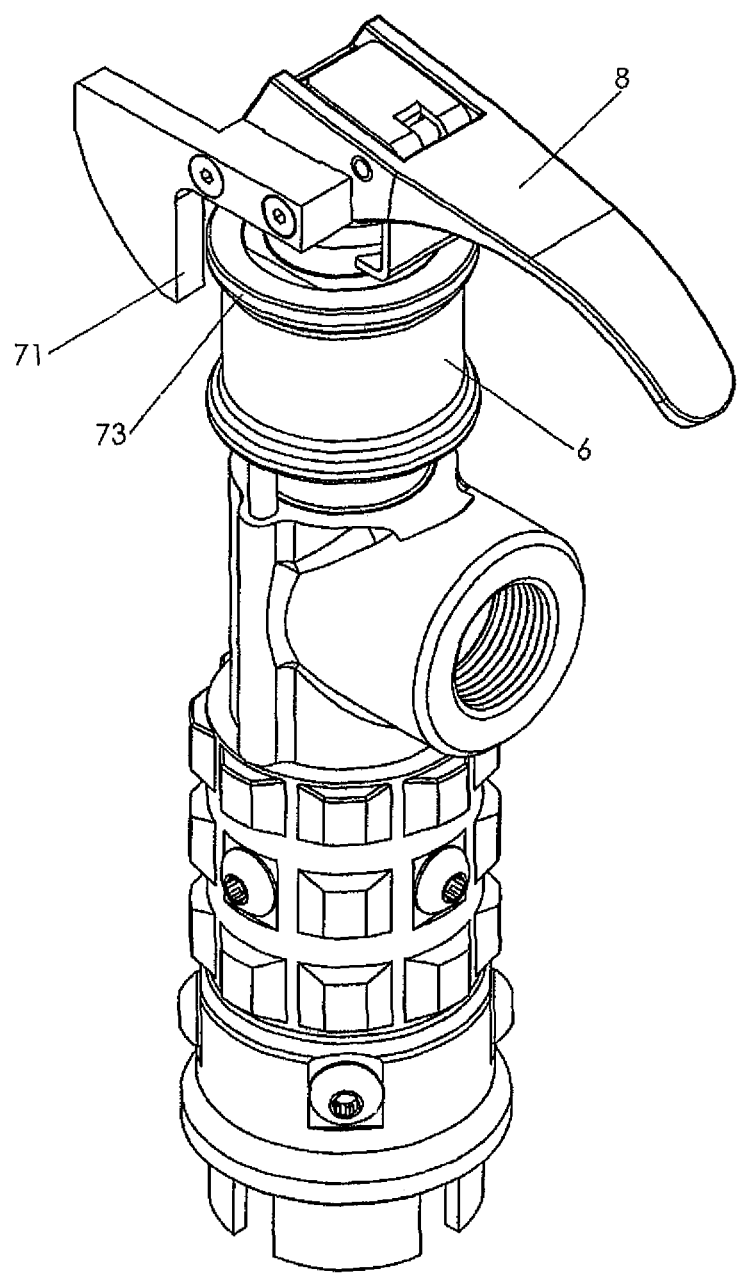
FIG. 21 is an isometric view of the valve assembly with the cam operator in the closed position and the retaining collar and safety collar in the open position showing the safety collar clearance with the safety tab.

FIG. 21 shows the valve with the safety collar 6 in the up position. If an attempt is made to rotate the cam operator 8 to the open position with the safety collar 6 up as shown, surface 71 will contact the side surface 73 of safety collar 6 and prevent partial opening or full opening of the valve. Thus the cam operator 8 is prevented from opening or even partially opening the valve when the safety collar 6 is not in its full down position. The interference member 70 preferably has a stop surface 74, and a surface 71 which engages the safety collar if the safety collar is not in the down position.

Figure 22:
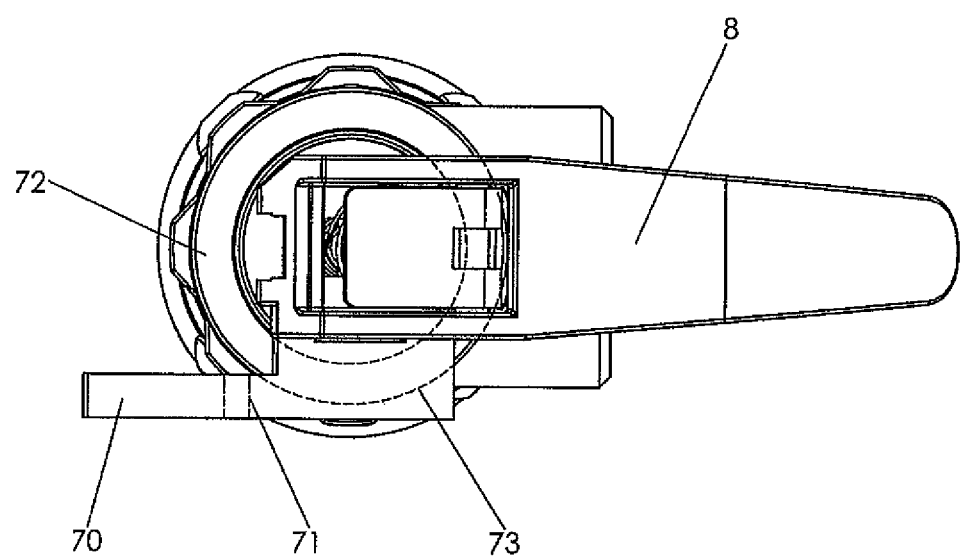
FIG. 22 is a top view of FIG. 19 showing the clearance between the safety tab and the safety collar.

FIG. 22 shows the relationship of interference member surface 71 and safety collar surface 73 which allows clearance between the aforementioned surfaces when the cam operator 8 is in the closed position. This allows the safety collar 6 to be lifted to its up position for attaching the valve to its connection point.

A significant advantage of the embodiment shown on FIGS. 19-22 is that the interference member prevents partial opening of the valve only when the safety collar is not in the down position. If the safety collar is down, then the segmented collar is in engagement with the threads on the fluid containing system.

The product transfer valve as shown in FIGS. 19-22 includes an internal sleeve for forcing the jaw members radially outward as the collar segments move to the radially retracted position. An alternate embodiment of a product transfer valve, otherwise similar to FIGS. 19-22, may include springs or other biasing members for biasing the collar segments radially outward, as shown by the coil springs 25 in FIG. 2 or the coil springs 52 in FIG. 12.

The segmented collar as disclosed herein includes internal threads which move radially to engage and disengage a threaded container connection. In other embodiments, the inner interconnection between the valve and the connection need not include threads, and the lower ends of the collar segments 50 may thus include jaw members which radially moving to engage or disengage a non-threaded connection. Various configurations of jaw members may thus depend on the design of the connection to which the valve is to be connected.

For valve shown herein, the valve includes a side port and an axial port in the valve housing. The segmented collar and the retaining collar are each spaced on one side of the side port (the lower side as shown in the figures), while the safety collar and the cam operated mechanism are on the axially opposite side of the side port (above the side port). In order to provide access in a variety of manners to the valve side port, elongate rods or other force transfer members as disclosed herein transmit axial forces between the safety collar and the retaining collar.

In other embodiments of a product transfer valve, the valve body may have an inlet port and an outlet port, and a valve stem axially movable to open and close the valve. The valve activation mechanism that is provided for axially moving the valve stem between the valve closed and the valve open positions may be a cam operated mechanism as disclosed herein, but alternatively may be the valve body itself or other member for actuating the valve. The segmented collar is provided axially movable relative to the valve body, and includes collar segments movable radially between a retracted position and an expanded position. A plurality of circumferentially spaced jaw members each have an internal thread for engagement with a mating thread on a fluid containing system, and the jaw members are movable radially inward and outward in response to axial movement of the segmented collar. The plurality of jaw members each move radially inward and outward in response to the axial movement of the segmented collar. One or more force transfer members may be provided for transmitting axial forces between the valve activation mechanism and the segmented collar, and an interference member supported on the valve activation mechanism prevents full or partial opening of the valve until the circumferentially spaced jaw members are radially inward for mating the with threads on the fluid containing system. The safety interlock concept as disclosed herein prevents the valve body from being released or detached from the threads on the fluid containing system when the valve is open, and also prevents the product transfer valve from being opened when the segmented collars are not fully contracted for mating engagement with the threads on the fluid containing system.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A product transfer valve, comprising:
   a valve body having an inlet port and an outlet port;
   a valve stem axially moveable with respect to the valve body to open and close the valve;
   a cam operated mechanism for axially moving the valve stem between a valve open position and a valve closed position;
   a segmented collar, the segmented collar including a plurality of circumferentially spaced elongate slots such that collar segments move radially with respect to the valve body between a radially retracted position and a radially expanded position;
   a plurality of internal threads on the segmented collar for engagement with a mating thread on a fluid containing system, the internal threads movable radially inward and outward in response to axial movement of a retaining collar;
   the retaining collar radially outward of the segmented collar for containing the segmented collar and moving the segmented collar to the radially retracted position when axially moved away from the cam operated mechanism and supporting one or more torque transfer members for rotationally driving the segmented collar with the retaining collar;
   a safety collar axially moveable with respect to the valve body, axial movement of the safety collar away from the cam operated mechanism causing axial movement of the retaining collar; and
   an interference member supported on the cam operated mechanism, the interference member engaging the safety collar to prevent full or partial opening of the valve until the safety collar is moved axially away from the cam operated mechanism.

2. A product transfer valve as defined in claim 1, further comprising:
   a plurality of elongate rods for transmitting axial forces between the safety collar and the retaining collar.

3. A product transfer valve as defined in claim 1, further comprising:
   a biasing member to bias the safety collar toward the outlet port and thereby bias the segmented collar to the radially contracted position.

4. A product transfer valve as defined in claim 1, wherein the collar segments are forced radially outward by a cam sleeve axially supported on the retaining collar.

5. A product transfer valve as defined in claim 1, wherein the collar segments are biased radially outward by a plurality of collar segment biasing members.

6. A product transfer valve as defined in claim 1, wherein the inlet port and the outlet port include a side port and an axial port in the valve housing, the segmented collar and the retaining collar each being axially opposite the safety collar and the cam operated mechanism relative to the side port.

7. A product transfer valve as defined in claim 1, wherein each of the segmented collar and the retaining collar includes a ramp surface for forcing the internal threads radially inward when the segmented collar moves to the radially retracted position.

8. A product transfer valve as defined in claim 1, wherein each one of the one or more torque transfer members extend through a respective one of the elongate slots for circumferentially aligning the segmented collar and the retaining collar.

9. A product transfer valve, comprising:
a valve body having an inlet port and an outlet port;
a valve stem axially moveable with respect to the valve body to open and close the valve;
a valve activation mechanism for axially moving the valve stem between a valve closed position and a valve open position;
a segmented collar, the segmented collar including collar segments movable radially with respect to the valve body between a radially retracted position and a radially expanded position;
a retaining collar radially outward of the segmented collar for containing the segmented collar and moving the segmented collar to the radially retracted position when axially moved away from the valve activation mechanism and supporting one or more torque transfer members for rotationally driving the segmented collar with the retaining collar;
a plurality of circumferentially spaced jaw members each having an internal thread for engagement with a mating thread on a fluid containing system, the plurality of jaw members each movable radially inward and outward in response to axial movement of the retaining collar;
one or more force transfer members for transmitting axial forces between the valve activation mechanism and the retaining collar; and
an interference member supported on the valve activation mechanism, the interference member preventing full or partial opening of the valve until the circumferentially spaced jaw members are radially inward for mating with the mating threads on a fluid containing system.

10. A product transfer valve as defined in claim 9, wherein the segmented collar includes a ramp surface for forcing the jaw members radially inward when the retaining collar moves to the radially retracted position.

11. A product transfer valve as defined in claim 9, wherein the collar segments are biased radially outward by a plurality of collar segment biasing members.

12. A safety interlock mechanism for a product transfer valve including a valve body having an inlet port and an outlet port, a valve stem axially movable with respect to the valve body, and a cam operated member for moving the valve stem between a valve open position and a valve closed position, the safety interlock mechanism comprising:
a segmented collar containing a threaded section for engagement with a threaded container member when the segmented collar is radially contracted;
a retaining collar radially outward of the segmented collar and supporting one or more torque transfer members for rotationally rotating the segmented collar with the retaining collar;
a safety collar axially movable with the retaining collar; and
an interference member supported on the cam operated mechanism, the interference member engaging the safety collar to prevent full or partial opening of the valve until the safety collar is moved axially away from the cam operated mechanism.

13. A safety interlock mechanism as defined in claim 12, wherein the one or more torque transfer members includes a plurality of pins supported on the retaining collar, the retaining collar limiting expansion of the segmented collar.

14. A safety interlock mechanism as defined in claim 12, further comprising: a plurality of axial slots in the segmented collar; and each of the one or more torque transfer members extending through the respective one of the slots for circumferentially aligning the segmented collar and the retaining collar.

15. A method of connecting and operating a product transfer valve fluidly connectable to a fluid containing system, comprising:
positioning a valve body having an inlet port and an outlet port; positioning a valve stem axially moveable with respect to the valve body to open and close the valve;
positioning a cam operated mechanism for axially moving the valve stem between a valve open position and a valve closed position;
axially moving a retaining collar relative to the valve body, the retaining collar enclosing a plurality of circumferentially spaced elongate collar segments such that the collar segments move radially with respect to the valve body between a radially retracted and a radially expanded position;
positioning a plurality of circumferentially spaced jaw members on each collar segment, each jaw member having an internal thread for engagement with a mating thread on a fluid containing system, the plurality of jaw members each movable radially inward and outward in response to axial movement of the retaining collar;
providing the retaining collar radially outward of the collar segments for supporting one or more torque transfer members for rotationally driving the collar segments with the retaining collar;
axially moving a safety collar with respect to the valve body, the safety collar being operative to the segmented collar such that axial movement of the safety collar causes corresponding axial movement of the retaining collar; and
supporting an interference member on the cam operated mechanism for engaging with the safety collar to prevent full or partial opening of the valve until the safety collar is moved axially away from the cam operated mechanism.

16. A method as defined in claim 15, further comprising: biasing each of the plurality of collar segments to the radially expanded position.

17. A method as defined in claim 15, further comprising: biasing the safety collar away from the cam operated mechanism.

18. A method as defined in claim 15, further comprising; transmitting axial forces from the safety collar to the retaining collar through a plurality of elongate rods.

19. A method as defined in claim 15, wherein the collar segments are radially outward of the valve body and the retaining collar radially surrounds the collar segments.

20. A method as defined in claim 15, wherein the collar segments and the retaining collar include ramp surfaces for forcing the jaw members radially inward when the collar segments axially move to the radially retracted position.

* * * * *